United States Patent [19]
Gujral

[11] Patent Number: 6,032,231
[45] Date of Patent: *Feb. 29, 2000

[54] MULTIPROCESSOR WITH SPLIT TRANSACTION BUS ARCHITECTURE PROVIDING CACHE TAG AND ADDRESS COMPARE FOR SENDING RETRY DIRECTION TO OTHER BUS MODULE UPON A MATCH OF SUBSEQUENT ADDRESS BUS CYCLES TO CONTENT OF CACHE TAG

[75] Inventor: Manoj Gujral, Santa Clara, Calif.

[73] Assignee: Unisys Corporation, Blue Bell, Pa.

[ * ] Notice: This patent is subject to a terminal disclaimer.

[21] Appl. No.: 09/040,193

[22] Filed: Mar. 9, 1998

Related U.S. Application Data

[62] Division of application No. 08/505,987, Jul. 24, 1995, Pat. No. 5,732,244.

[51] Int. Cl.$^7$ ..................................................... G06F 13/00
[52] U.S. Cl. ............................ 711/145; 711/141; 711/146
[58] Field of Search ................................... 711/141, 145, 711/146, 142, 143; 395/296, 595, 847, 848

[56] References Cited

U.S. PATENT DOCUMENTS

| | | | |
|---|---|---|---|
| 4,648,030 | 3/1987 | Bomba et al. | 364/200 |
| 5,504,874 | 4/1996 | Galles et al. | 395/472 |
| 5,506,971 | 4/1996 | Gullette et al. | 395/296 |
| 5,535,345 | 7/1996 | Fisch et al. | 395/309 |
| 5,594,880 | 1/1997 | Moyer et al. | 395/595 |
| 5,732,244 | 3/1998 | Gujral | 395/468 |
| 5,822,611 | 10/1998 | Donley et al. | 395/826 |

OTHER PUBLICATIONS

Wen–Yen Lin and Jean–Luc Gaudiot, I–Software cache: A Split–Phase Transaction Runtime Cache System, Oct. 1993.
Charles, R. Moore, The Power PC 601 Microprocessor, 1993.
Chiung–San Lee and Tai–Ming Parng, Performance Modelling and Evaluation for the XPM Shared–bus Multiprocessor Architecture, 1994.
Seong tae Jhang and Chu Shik Jhon, A New Write–Invalidate Snooping Cache protocol For Split Transaction Bus–Based Multiprocessor Systems, 1993.

*Primary Examiner*—John W. Cabeca
*Assistant Examiner*—Pierre-Michel Bataille
*Attorney, Agent, or Firm*—Rocco L. Adornato; Mark T. Starr; John J. McCormack

[57] ABSTRACT

A method and system for arranging and operating a multiprocessor computer server system having "split-transaction bus" architecture, including bus modules operating with an address phase and a cycle phase. The bus modules are arranged for access by a prescribed resource stage to facilitate "RETRY" operations. The method includes providing a Cache Tag and Address Compare, arranging the system so that a first bus module stores the address for the Resource stage in the Cycle Tag; and comparing subsequent address bus cycles to the contents of the Cache Tag so that, given a "match", a "RETRY" direction is responsively sent to any other bus module that requests access. The system provides components supporting the above method steps.

14 Claims, 6 Drawing Sheets

MULTIPROCESSOR WITH SPLIT TRANSACTION BUS ARCHITECTURE PROVIDING CACHE TAG AND ADDRESS COMPARE FOR SENDING RETRY DIRECTION TO OTHER BUS MODULE UPON A MATCH OF SUBSEQUENT ADDRESS BUS CYCLES TO CONTENT OF CACHE TAG

This is a Division of U.S. Ser. No. 08/505,987, filed Jul. 24, 1995, now U.S. Pat. No. 5,732,244.

BACKGROUND, FEATURES

In a split-transaction system bus architecture (e.g., see FIG. 1), a system bus cycle can be split into an address phase and a data phase. Preferably, the bus module runs each portion of the cycle semi-independently, releasing the corresponding portion of the bus when that part of the cycle is complete. Once that portion of the bus is released, another bus module can then acquire it and initiate a new cycle in parallel, with the first module completing the rest of its own cycle.

For example, module A in FIG. 1 might acquire the address bus, perform its address cycle, then acquire the data bus, and perform the data cycle. Once module A completes its address sequence, it can release the address bus, whereupon module B can acquire the address bus and begin its own address cycle, while module A is working on its data cycle (e.g., see FIG. 1, with bus modules A, B, coupled to Data bus, Address bus).

For this scheme to work, each bus controller must keep track of which cycle is being executed, and determine when both halves are successfully finished, before the cycle is retired. It also needs to snoop the system bus for other modules which are attempting to access the same resource. If a second module tries to access an address for which the first module has already successfully completed an address phase, but not the data phase, the first module must force the second module to retract this request until the first module retires its own cycle. This process is known as a "retry response". The second module will withdraw its cycle and try it again later, by which time the first module may have retired its own cycle.

To implement this technique, a bus module should store the address of the resource it is accessing in a "Cycle Tag" once it has successfully completed its address phase. After that, it compares subsequent address bus cycles to the contents of the Cycle Tag, and, if a match is detected, issues appropriate retry responses to the requesting bus module. Once its own data phase is complete and the cycle is retired, the tag entry is cleared and subsequent address cycles are ignored (e.g., see FIG. 2, Bus Module logic BM, with Cycle Tag unit 2-CT). Thus, an object hereof is to implement split-transaction bus cycles, especially for "Retry" between bus modules. A related object is to do so using cycle tag means adapted to trigger Retry.

Other objects and advantages of the present invention will be apparent to those skilled in the art.

BRIEF DESCRIPTION OF THE DRAWINGS

The foregoing and other features and advantages of the present invention will be appreciated by workers as they become better understood by reference to the following detailed description of the present preferred embodiments, these being considered in conjunction with the accompanying drawings, wherein like reference symbols denote like elements.

DETAILED DESCRIPTION OF PREFERRED EMBODIMENT

Figure 2:
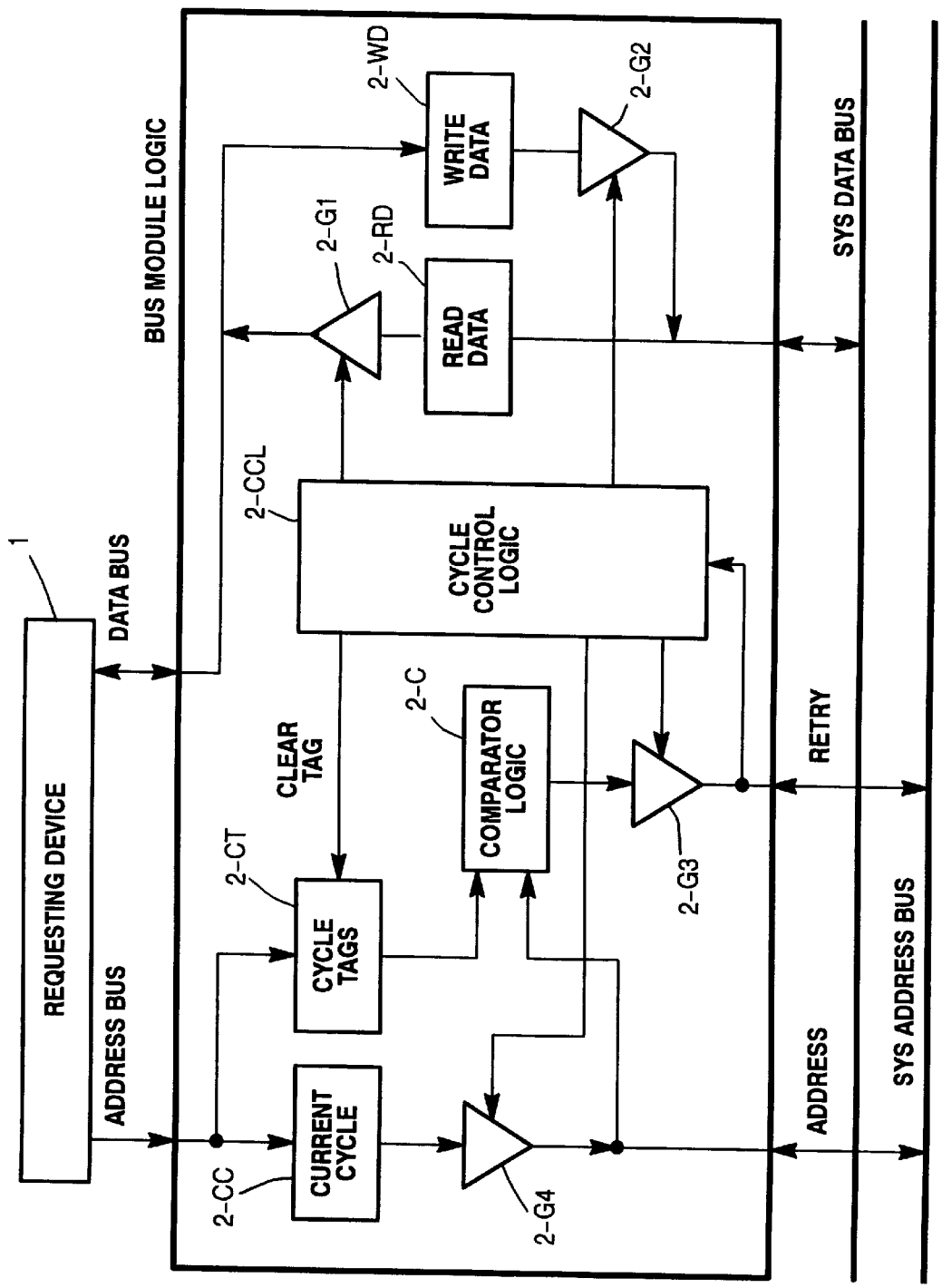
FIG. 2 is a block diagram depicting cycle tag architecture according to a preferred embodiment.

FIG. 2 depicts "cycle tag architecture" wherein a requesting device 1 will be understood as accessing bus module logic unit BM via an Address Bus and a Data Bus to initiate a system cycle on a related system address bus.

Unit BM will be understood to couple the input address bits to a Current Cycle register 2-CC and a cycle tags unit 2-CT, which is, in turn, coupled to a Cycle Control Logic unit 2-CCL and a Compare logic unit 2-C.

The data bus is bi-directional; in a write-cycle, write-data is sent from the Requesting Device into module BM and loaded into write data register 2-WD. From there, it flows through a tri-state Buffer (driver 2-G2) and out to the system data bus—during the "data phase".

Similarly, for Read Cycles, read-data flows into BM from the system data bus, and is loaded into Read-Data register 2-RD, then through tri-state buffer 2-G1, and hack out to the Requesting Device.

Like the data bus, the system address bus is also bi-directional; the "current cycle" in (register) 2-CC is used to drive-out addresses from the requesting device—these addresses flowing through tri-state buffer 2-G4, and out to the system bus. The path for the comparator logic 2-C is to snoop incoming address cycles from other bus modules. A "hit" to the cycle tag from an IN-coming cycle results in a RETRY response to this incoming cycle.

Figure 3:
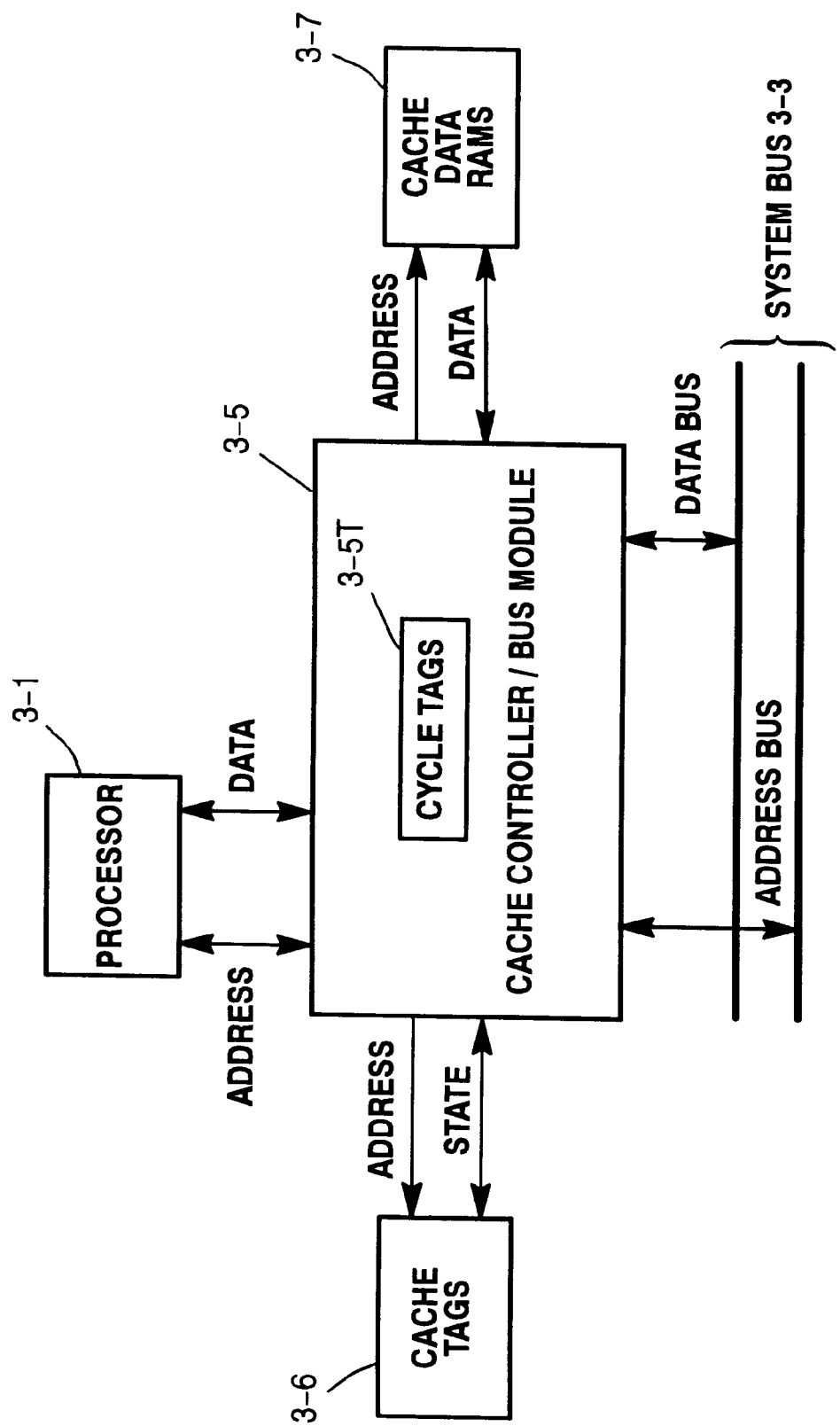
FIG. 3 depicts a related embodiment for external cache means.

In a multiprocessor-environment, bus modules will typically be implemented as a part of an external cache memory architecture positioned between a local processor and the system bus (e.g., as in FIG. 3). In these situations, the resource being snooped will typically be cache lines in system memory. For example, if a cache controller (e.g., 3-5, FIG. 3) is servicing a write miss by performing a write allocation of the desired cache line from system memory, the sequence of events might proceed as follows (and see FIG. 3, an example of external cache architecture, with processor 3-1, system bus 3-3, and with cache controller [bus module] 3-5 between them (having cycle tag units 3-5T, with cache tags unit 3-6 and cache data RAM array 3-7 coupled to controller 3-5):

Write-allocation:

1) Cache controller 3-5 gains control of address bus.
2) Cache controller generates address cycle.
3) Other cache controllers snoop address for cache coherency or cycle hits. All miss.
4) Cache controller 3-5 loads cycle tag -for write allocation cache line address.
5) Cache controller begins monitoring data bus for cache line transfer.
6) System memory gains control of data bus.
7) System memory generates data cycle.
8) Cache controller 3-5 receives data transfer.

9) Cache controller updates cache tag entries, in 3-6;

10) Cache controller clears cycle tag entry, in 3-5T, and retires bus cycle.

If another bus module attempts access to the same cache line between steps # 4–10, the cycle will produce a "hit" to the cycle tag entry. The cache controller reacts by issuing a retry response to the other bus module, forcing it off the address bus. Some time later, after the cache line has been loaded into the local cache memory and the write data loaded into it, the other bus module can reinitiate the same address phase. This time, the cycle will produce a snoop hit to the cache tag, and the cache controller can take appropriate steps to supply the requested cache line. (Note—cache and cycle tags must both be snooped for each bus cycle—if both "hit", the cycle tag must take priority, since it represents the most recent state of the cache line.)

If a bus module can initiate new address cycles before its own prior bus cycles have been retired, it must supply separate cycle tag entries for each such cycle. For example, if a bus controller supports "posted" writes, it may typically happen that a processor will issue a posted write, followed by a read. The bus controller can respond by generating two consecutive address cycles—one for the write, immediately followed by one for the read. The read address may be generated before the write cycle has been retired, with the end result that both cycles are currently pending on the data bus.

Figure 4:
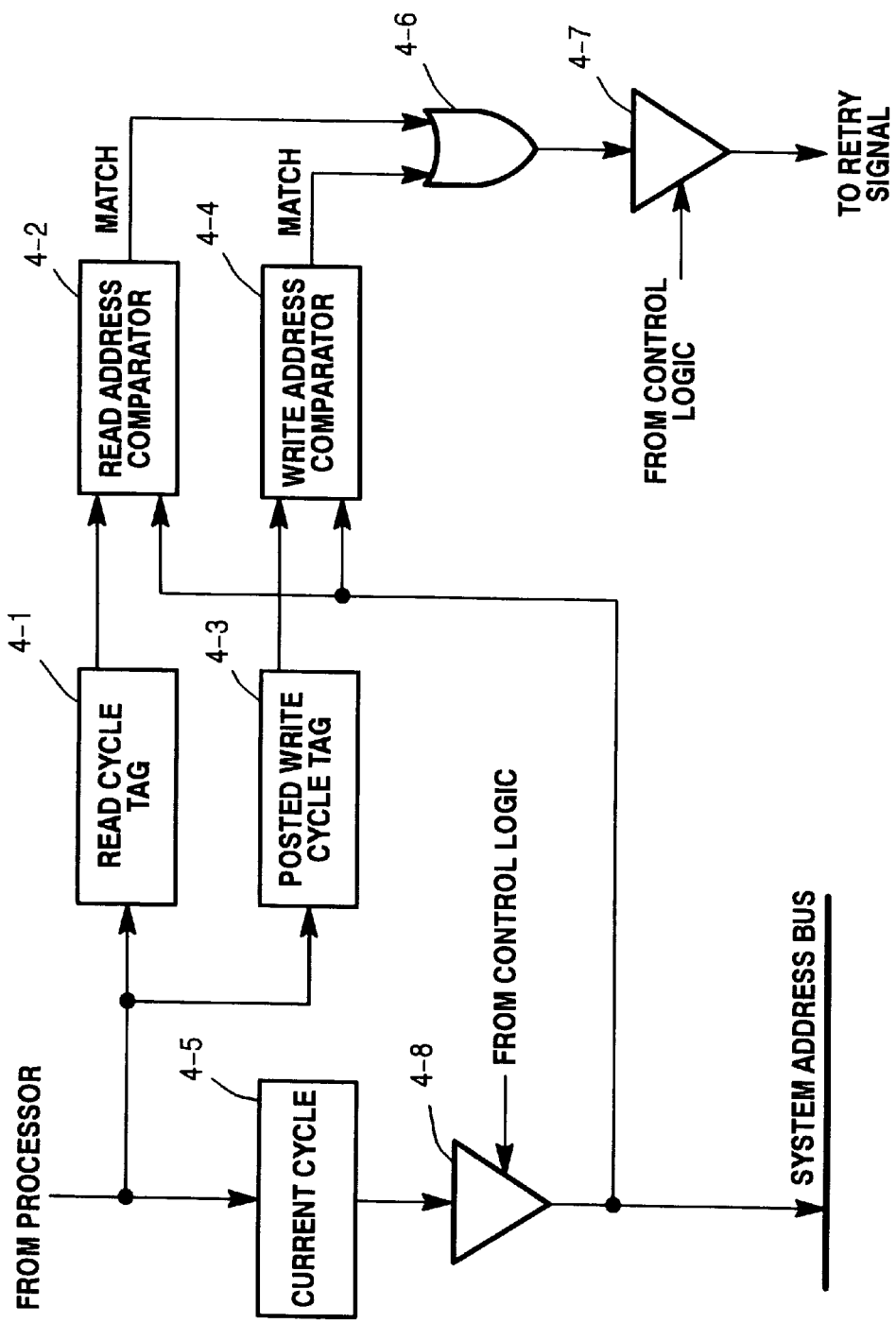
FIG. 4 shows related multi-tag snoop architecture.

For this situation, each cycle must provide a cycle tag entry, both of which will snoop on future system bus cycles. If either one produces a snoop hit, a retry response will be generated. For example, see FIG. 4: "multi-tag snoop architecture", with read-cycle tag 4-1, associated read address comparator 4-2, posted write-cycle tag 4-3 and associated write address comparator 4-4. Current cycle register unit 4-5 provides an address output, via control logic (as shown in FIG. 2), 4-8 to apply address signals to the system address bus, and to the two comparators 4-2, 4-4 - - - from which a "match" output is fed to unit 4-6 and thence, via unit 4-7 to generate "RETRY" (e.g., as noted above).

Figure 5:
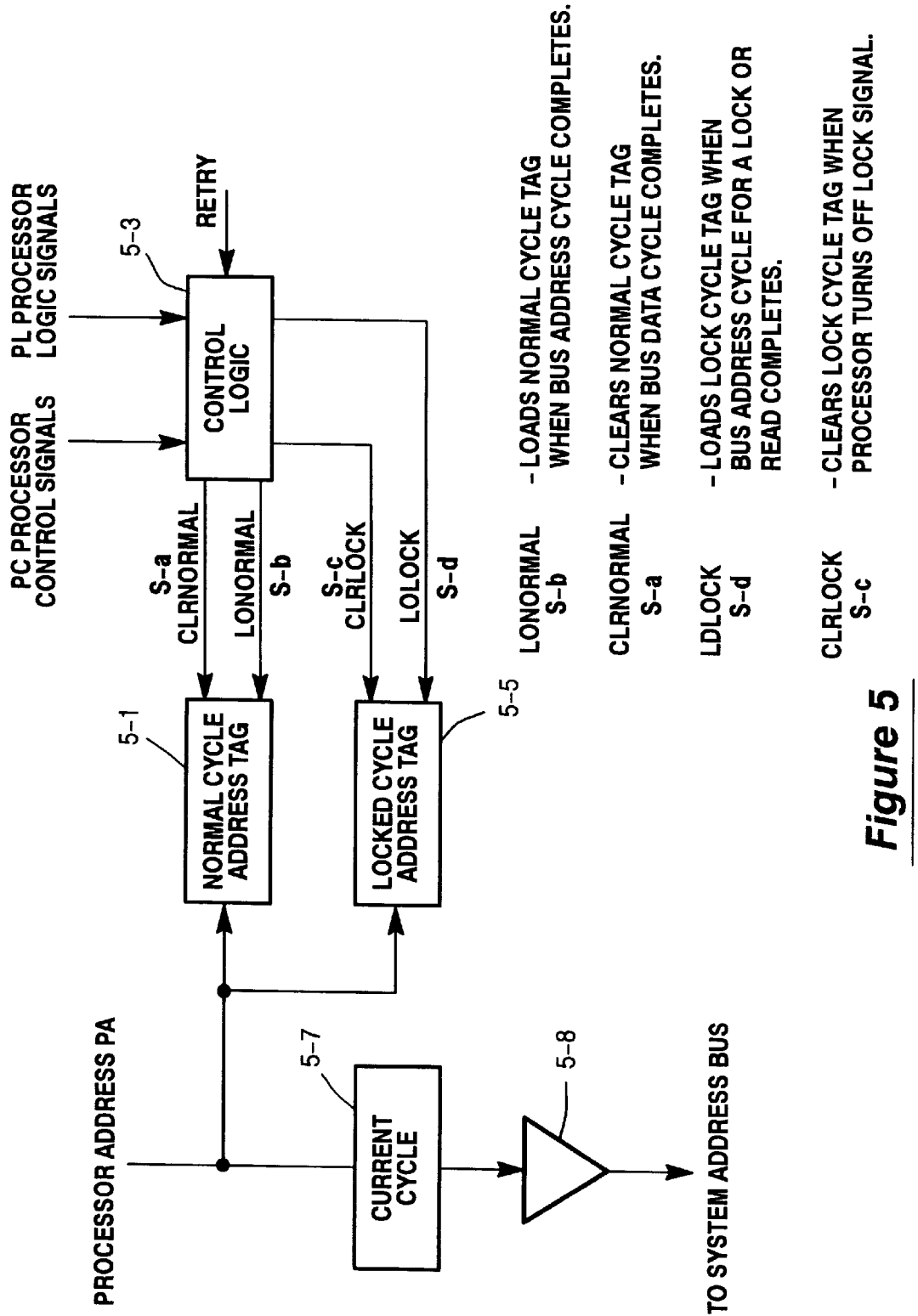
FIG. 5 depicts a Lock Cycle Tag array.

Lock Cycle Tag:

An additional cycle tag can be used to support cacheable locks, which perform local read-modify-write sequences. If a processor issues a locked read to the cacheable address space, the cache controller can perform the usual cacheable read sequence, while loading the lock cycle tag simultaneously. (This will happen regardless of whether the read is a miss or a hit; e.g., see FIG. 5.) While the cache controller is waiting for the processor to issue the write cycle of the locked sequence, the lock cycle tag remains active, forcing a retry of any system bus cycle which attempts to access the cache line that is locked. Once the write cycle is complete, the lock cycle tag is cleared, unlocking the. cache line for the rest of the system.

Use of this technique can avoid the need for using a "Lock" signal on the system bus—instead, the system relies on the cache coherency mechanism of the cache controller to insure unique access. to a cache line, coupled with the lock cycle tag to maintain unique access throughout the entire locked sequence. For instance, see FIG. 5: a "Lock Cycle Tag" array LCT including a pair of Address Tag units: 5-1 for "Normal Cycle" and 5-5 for "Locked Cycle". A related Control Logic unit 5-3 accepts input as follows: "RETRY", Processor Control signals $P_C$ and Processor Logic signals $P_L$ and then responsively applies "LOAD" signals s-b, s-d and "CLEAR" signals s-a, s-c to Tag Units 5-1, 5-5 respectively.

In particular, signals s-a, s-b to Normal Cycle Address Tag unit 5-1 are as follows:

s-a: "LD NORMAL": to load-unit 5-1 when the "bus-address-cycle" is completed; and s-b: "CLR NORMAL": to clear unit 5-1 when a "bus data cycle" is completed.

And, signals s-c, s-d to locked cycle address tag unit 5-3 are as follows:

s-d: "LD LOCK" to load unit 5-5 when the bus address cycle for a "Locked Read" is completed; and s-c: "CLR LOCK" to clear unit 5-5 when the processor turns off a "Lock Signal" $P_L$.

"Processor Address" signals PA are input to tag units 5-1, 5-5 and also to a "Current Cycle" unit 5-7 which, responsively outputs an address signal to the tristate buffer 5-8, which, in turn, drives the system address bus.

Typical operational sequence is as follows:

WRITING: is performed as above ("write-allocation"), except that step 4 is now a "Read Allocate", and loads both tags because a "processor lock" signal is active.

Also, at Step 10, only the normal cycle address tag is cleared.

The sequence continues as follows:

11) Processor performs write cycle to same cache line (write will be an automatic "hit" to the cache, resulting from prior Read-Allocation—so, no system bus cycle is generated).

12) Processor releases lock signal.

13) Cache Controller clears lock cycle tag.

Retries can now occur between steps No. 4–13.

Write-Thru Caches; How Handled:

For a write-thru cache, all write cycles will ultimately be issued directly to system memory—so all of them are posted to the write queue. Because of this, the initial tag lookup is unnecessary, since only the tag status at the end of the write queue will distinguish one course of events from another. For a write hit, the write cycle is issued to system memory, and then back to the local cache RAM. For a write miss, the write cycle is issued only to system memory. (For hits and misses, if other caches contain copies of the same line, they must be invalidated.) In both cases, the write queue is then advanced to the next entry. Reads from other system bus masters can be completed immediately by system memory. (This is a "race" condition—the first cycle which gets to the system bus is the winner, which will also determine whether the read data will include the posted write.) Other writes from the system bus will result in invalidation of the cache line locally, even if the local cache has posted a write to it. If the cache later needs to "evict" the cache line, it merely marks its line as "invalid". "Eviction" will generally result from the cache performing a "line-replacement" which results from a "read-miss" that is mapped to the same cache tag. The read allocation process will clear the tag, and update it to refer to the new cache line.

Write-Back Caches; How Handled:

For a write-back cache, the initial tag lookup is performed immediately. On a write to a line which the local cache holds exclusively, the write can be performed directly to the local cache if, and only if, the Write Queue is currently empty. Otherwise, the write hit must be queued, to protect the "strong" write-ordering requirement. All other tag lookup results (i.e., hits to shared lines or misses) will generate a load to the Write Queue.

When a write reaches the end of the queue, a second tag lookup is performed. If a write hit to an exclusively-held cache line results, the write is immediately performed into the local cache memory. If a write hit to a shared cache line results, the cache broadcasts an invalidation sequence out to the system bus; thus, all other caches which currently hold a copy of that line must mark it as "invalid". The write is then performed into the local cache memory.

On a write miss, the cache performs a write allocate sequence on the system bus. Any cache which holds a "dirty" copy of the line must write it back to memory or supply it to the requesting cache (so that the latest version of the line is available), and mark it as "invalid". Once the line has been obtained, the cache stores it into the local cache memory, and performs the write on it there. The end result of all these sequences is that the cache line will be marked as "dirty" in the local cache tag.

Reads, write allocations, and invalidation sequences from the system bus must be tracked and serviced by the local cache, even when writes to the same line are posted internally. If the current tag setting results in a hit to a "dirty" line by a system bus read or write allocate sequence, the cache must supply the data by performing a write-back sequence. If the sequence is a read, the cache can remark the line as "shared". If the sequence is a write allocate, it must be marked "invalid". With an invalidation sequence, it must be marked "invalid". (It is this final setting of the tag state which the Write Queue will check when the current entry is serviced.) If the cache later needs to evict the line, it performs a write-back to system memory and marks it line as "invalid".

Figure 1:
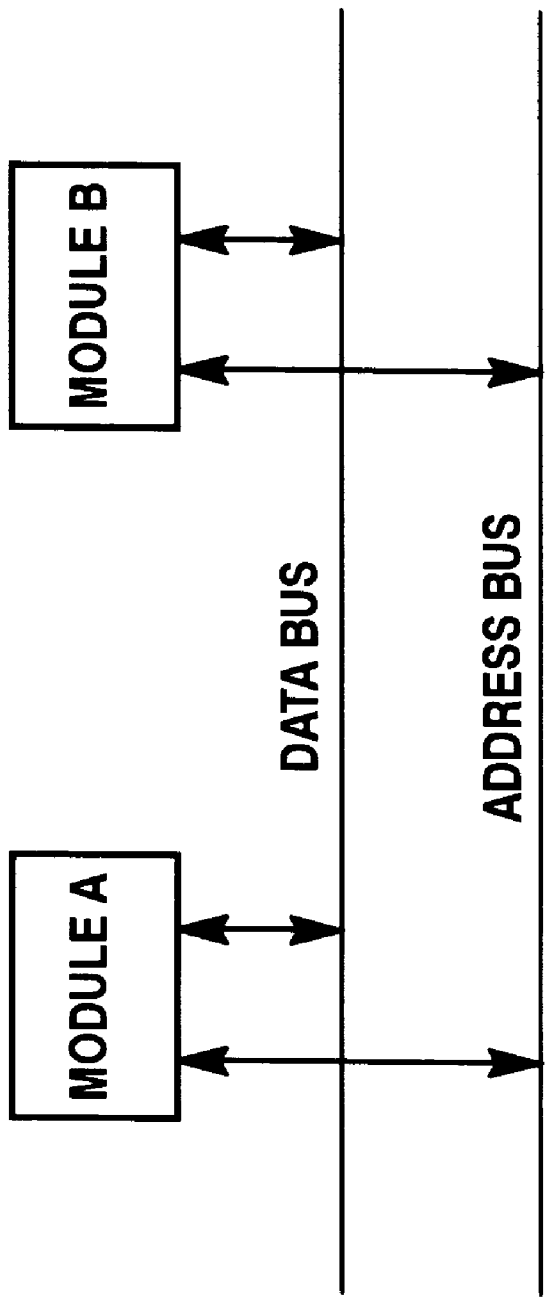
FIG. 1 is a very schematic block diagram of an exemplary pair of computer system bus modules.
Figure 1A:
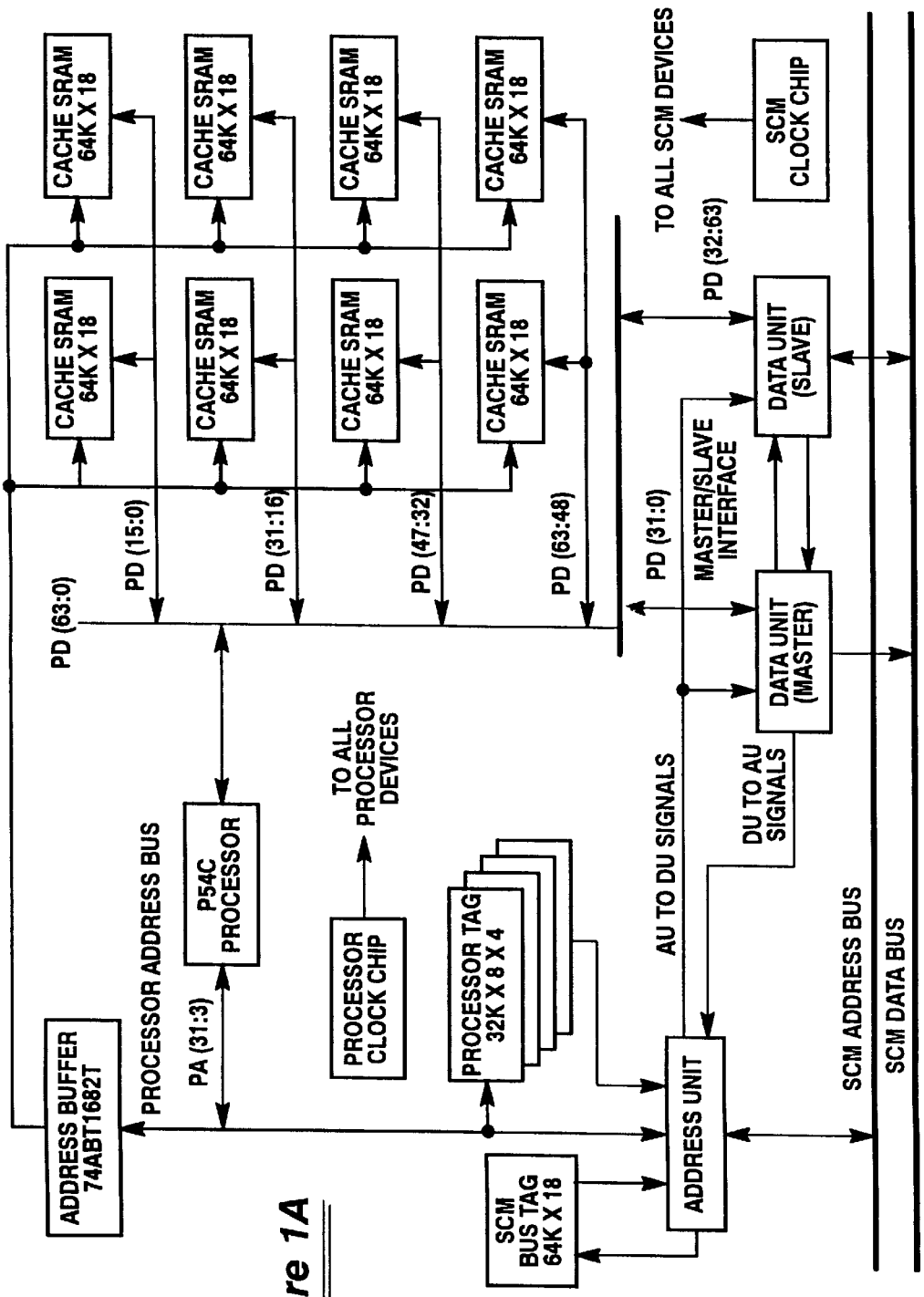
FIG. 1A depicts a system apt for using such embodiments.

System Application:

The foregoing finds special utility in multiprocessor systems, especially servers requiring coherent, fast "second-level" caches. One such system (hereinafter "MP-system") uses highly parallel architecture using a second-level custom cache controller for Pentium-family processors that are capable of queuing and processing up to 19 transactions simultaneously. The cache is preferably used on a board in a one- to 10-Pentium processor system for commercial on-line transaction systems (e.g., see FIG. 1A).

Called the P52 chip set, it is designed for use with P54/P55 processor chips to implement high-performance, multiprocessor server systems.

The task of this chip set is threefold:
provide necessary cache functions;
implement the interface between system and processor buses; and
control the flow of data throughout the processor module.

Though extensive use of parallel buffer, pipelining techniques and a large collection of independent state machines, the chip set is capable of performing all those tasks concurrently, while keeping careful track of any cycle interdependencies and maintaining a strong write-ordering strategy. Extensive buffering of requests from both buses helps to increase system throughput and reduces unnecessary cycle retries.

Two-way Set-associative:

The P52 chip set can implement a 1-, 2- or 4-Mbyte, two-way set-associative, combined instruction and data cache for a P54C/P55 processor with 3.3 VTTL-signal levels. It implements a full 64-bit data path from the system bus to the processor bus, and into the cache. Cache lines consist of eight beats of 8 bytes, for a line size of 64 bytes.

Read hit performance supports cycle times of 3-'1-1-1 for a four-beat burst. If the next cycle is a pipelined read hit, cycle time for that next read is reduced to 1-1-1-1. Through the use of write-posting techniques, write-cycle performance is four clocks, regardless of a hit or miss.

Cache coherency with other processor modules is provided using a "Mesi" (modified exclusive shared invalid) strategy. The cache operates in a copyback mode—data is written back to memory only if a modified line needs to be replaced, or another system-bus module requires access to a modified line.

Coherency with the Pentium's L1 cache is maintained using either a write-once or write-through strategy, which is software-selectable.

On read misses, the cache controller will automatically initiate an L2 cache line fill from system memory. All eight beats of data are ultimately loaded into the local cache, in critical word first, based on Intel burst order. If the processor issued the CACHE# signal, the BRDY# (burst ready) signal will be issued to the processor with the first four beats of data, loading it into the processor and the cache simultaneously. On write misses, the cache controller will again initiate an L2 cache line fill from system memory.

When the data arrives, the write data is merced with the incoming cache line, and then loaded into the cache. If either type of cache line fill requires replacement of a modified line in the caches a replacement copyback sequence is automatically initiated to evict the old data. That happens in parallel with the allocation request, such that, by the time the incoming data is ready to be loaded into the cache, the old line has been copied out and is either waiting to be transmitted back to system memory or has, in fact, already been sent. A dedicated copyback buffer is provided for read replacements and another one for write replacements.

Cycles awaiting completion on the processor bus do not interfere with snoops being generated from the system bus. If, for example, a read miss is. pending on the processor bus when a snoop hit occurs on the system bus, the cache controller will activate the AHOLD (address hold) signal and take possession of the processor bus, issue a BOFF# (back-off) signal to retry the pending read and proceed with the necessary L1 snoops and copy backs. When the cache controller releases the processor bus, it will wait for the read cycle to be regenerated by the processor, then supply the data when it arrives from the system bus.

Snoopinq Hold:

If the data arrives during the snoop procedure, it is simply held in an internal data buffer until the read cycle is restarted.

The cache controller can post up to four write cycles, which are stored in an internal queue. A write entry is posted to the queue if it's a non-cacheable address, if it's a write miss or if it's a write hit, but the write queue is not empty. Once an entry reaches the end of the write queue, it becomes the currently serviced entry. If the current entry is a cacheable write, the current line status is rechecked. If the current Write queue entry results in a cache miss, the fetched write allocation data will be merged with the current write queue entry data, and then with each consecutive entry in the write queue that accesses the same cache line.

These secondary merges will continue until the queue is empty or the next entry does not access the same cache line as the previous write. At that point, the cache line is then loaded into the cache, and the next write cycle processed. If the current entry is non-cacheable, it is issued directly to the system bus.

The P52 chip set can also implement cacheable locked read/modify/write sequences. If the locked address hits in the cache to an exclusive or modified line, the locked sequence can be contained entirely in the local processor module. Otherwise, the cache controller will perform the necessary cache-coherency cycles on the system bus to gain exclusive access to the cache line, and proceed with the cycle from there.

The cache controller also snoops the system bus for incoming accesses to cacheable addresses. If a bus cycle hits to an exclusive or shared line, the cache issues a shared response to the requester, as needed.

If a bus cycle hits to a modified line, the cache issues an abort response, which indicates to the system that the cache will be supplying the data instead of system memory. It then initiates the necessary copyback procedure, snooping the L1 cache, as needed. The cache controller supports up to six open copyback requests simultaneously. (One is dedicated for hits by single-beat cycles from non-bursting devices, another one for special high-priority system-bus requests.) It can also queue up to four cache-line invalidation requests, as well.

The chip set implements a number of extra processor-module control features and system-enhancement functions. All these features are configured and controlled by software via an internal register set, accessible from both the processor and system buses.

The P52 chip set tracks and reports a wide variety of error conditions relating to bus, processor and cache operations. Error-related registers can identify the nature of the error, and can latch any associated cycle information available when the error was detected. For example, a data-parity error detected during a read-allocation cycle would indicate the following:

the presence of the parity error the system bus address cycle that resulted in the error the type of cycle being performed (i.e., a read allocate)

In addition, if properly configured for it, the chip set would issue an NMI (non-maskable interrupt) request to the local processor. The local processor could then access its local chip set to ascertain the error condition.

The register set also supports a maskable interrupt scheme that can generate INTR (maskable interrupt request) signals to the local processor. It supplies three vector registers with a fixed priority among them. The registers are loaded with the value of the interrupt vector that will ultimately be supplied to the processor. By writing to either of the two higher-priority vector registers, an INTR is automatically generated.

The third vector is for use with event-counter overflows, described later. Once the INTR is activated, the chip set services the resulting processor-interrupt-acknowledge cycle by supplying the value of the highest-priority vector. If no further interrupts are pending, it then deactivates INTR automatically.

The chip set also implement a set of four 64-bit counters that can be used to track various processor-module events. They can be used to measure module or system performance, detect the presence of certain types of cycles, count durations, etc. The 46th bit acts as an overflow detector, which can be configured to generate an interrupt condition through INTR to the local processor. The lowest-priority vector register supplies the interrupt vector for this request.

The cache controller is optimized to interface to the Synchronous Coherent Memory (SCM) bus, a proprietary high-performance system backplane. SCM bus uses Gunning transceiver logic (GTL) signals that implement a split-transaction, out-of-order completion model. Bus speeds currently support clock rates up to 66 MHz, permitting peak transfer rates of 533 Mbytes/second for the 64-bit-wide data path. Cache-coherency support signals are built-in to facilitate multiprocessor configurations.

The bus is split into two logical functions, a 32-bit address bus and a 64-bit data bus. Each bus is arbitrated for separately using a three-wire Request, Grant, Busy protocol. Priority request modes are also defined. Arbitration is managed through a central arbiter. Arbitration for one cycle can occur in parallel with the transmission of a prior address or data cycle. All address, control and data lines are parity protected. Address cycles can define single-beat or eight-beat data transfers. Byte-enable signals are provided for each byte of the 64-bit data path for single-beat transfers, while for eight-beat bursts all bytes are assumed valid. Address cycles are terminated with a response phase that indicates successful cycle completion, a retry condition, and possible cache-coherency signals indicating a Shared line or an Aborted memory cycle. Once an address cycle is successfully completed, the bus module that is supplying the data requests the data bus, and when granted, transmits the data transfer. During an Aborted transfer, copyback data is supplied to the requesting module and loaded back into memory simultaneously.

The two halves of the transfer sequence are transmitted with identical ID cycle numbers. Each bus module is assigned a unique range of ID numbers to transmit with any cycle it initiates. A transaction is "opened" after successful transmission of the address phase. The transaction is "closed" when a data phase is transmitted with the same ID as the address phase. Use of this technique permits out-of-order completion of any bus cycle.

The chip set is capable of initiating multiple system-bus cycles, without waiting for completion of prior cycles. It can initiate five different cycles in this fashion: one read, one write, one retry copy back (used for responding to single-beat read or write cache hits, which can't accept Abort sequences), and two replacement copy backs. In addition, it can queue up to five other snoop copy backs, and four snoop invalidations, plus be servicing one SCM register read, and one SCM register write.

It can therefore be processing up to 16 SCM transactions simultaneously. (Assuming an additional three posted writes are pending in the write queue, the address unit can manage up to 19 simultaneous transactions altogether.)

The chip set will internally track any cycle dependencies automatically, preventing final internal processing on any cycle that is awaiting completion of another cycle. For example, if a read miss results in a modified line replacement copy back, but the read replacement copyback buffer is currently full, the read cycle will not be immediately issued to the system memory until the prior copyback sequence has completed. Incoming SCM snoops that hit on a cycle-in-progress will generally be retired. Other incoming cycles that encounter full queues will also be retried.

In the event that the processor module receives excessive retries from the SCM bus (possibly due to a live-lock condition), the chip set has the capability to generate random back-off delays before reinitiating a request for the bus. It can also artificially elongate its bus tenure, in a process referred to as stretching. Both those functions can be software-configured for activation and duration.

Chip-set Implementation:

The P52 chip set consists of two ASICs implemented with Motorola's H4C CMOS gate-array technology. The first chip, the Address Unit (AU), is the main control unit of the entire processor module. It interfaces to the processor and system-address buses, maintains the cache tags, performs all cache snooping functions, queues cycles, arbitrates for the SCM address bus, issues control signals to the cache data RAMs, decodes register accesses, controls access to the processor bus, resolves cycle dependencies, manages board initialization and configuration, issues command sequences to the other chip and generally manages the flow of all transactions in the module.

The second chip, the data Unit (DU), provides the data path between the system and processor buses. It buffers all data transfers, arbitrates for the SCM data bus, manages on-chip register-data transfers and issues cycle-completion responses to the AU. Each DU provides a 32-bit data path, plus parity, so two are needed to implement the 64-bit path required by the processor. In this mode, one DU acts as a master and the other as a slave.

For maximum flexibility, both chips have been designed to use independent clocks on the processor- and system-bus interfaces. Each clock can range from 50 to 66 MHz, permitting the use of processors with bus speeds up to 66 MHz. All signals in and out of the chips are synchronized with the rising edge of the clock in its corresponding clock domain.

System- and processor-bus interfaces on both chips have been designed for direct connection to the appropriate bus signals, without the need for intervening buffers or level translators. The SCM bus signals implement a direct GTL I/O connection, while the processor signals implement 3.3-V drivers and 5-V tolerant receivers. Chip-to-chip signals are all 5-V TTL, as well as SRAM control signals.

Each chip is provided with a JTAG TAP (test access pin) controller and boundary-scan registers. Internal core bits are also accessible from other scan chains provided. Other implemented JTAG registers include chip identifiers and internal PLL test circuits.

Each chip is mounted into a 304-pin Motorola Microcool quad flat pack.

The AU and two DUs work to completely isolate the system bus from the processor bus, permitting independent actions on each bus. The AU and DUs connect directly to each bus. The cache data RAMs are connected directly to the processor data bus, along with the DUs and the processor itself. They are implemented using 64k×18 synchronous static RAMs for 1- and 2-Mbyte configurations, and 128k or 256k×18 synchronous static RAMs for 4-Mbyte configurations (assuming such parts are available). On the address side, the processor and the AU connect together directly. The address is then buffered through a pair of 74ABT16821 registered bus driver chips to increase the address signal fan-out to the cache data RAMs.

The cache controller employs a dualtag architecture, providing dedicated tag RAMs for the processor and system buses. That approach permits simultaneous tag lookups and updates on each bus. (Implemented internally is an extra set of tags that correspond to contents of any currently active transactions in the AU address queues.) Therefore, two sets of tag RAMs are required.

On the processor bus, fast lookup time is essential, so a set of four 32k×8 asynchronous static RAMs are provided that are driven directly by the processor address bus. That provides a 32-bit data path from the processor tags, wide enough to load both cache ways simultaneously. On the SCM side, a cache-coherency response is not needed until the seventh clock of an address snoop, so a slower tag lookup is permitted. Consequently, the bus tag is implemented using a single 64k×18 synchronous static RAM. That requires two consecutive RAM cycles to access both cache ways for a single snoop sequence.

Clock signals for the processor module are distributed from a pair of independent clock chips. The SCM clock is taken directly from the SCM bus, and is distributed to the AU, both DUs and the bus tag RAM. The processor clock is driven by an on-board crystal, and is distributed to the AU, both DUs, the processor, the address buffers and the cache data RAMs.

Altogether, a typical 2-Mbyte cache configuration would consist of a processor, an AU, two DUs, two processor address buffers, two clock chips, one bus tag RAM, four processor tag RAMs and 16 cache data RAMs—a total of 29 components. All control signals are managed by the chip set, so no glue logic is required.

Reprise:

In summary, a unique cycle tag entry would need to be provided for each cycle that could be successfully initiated simultaneously. For example, if a cache controller can start a write, a read, and a cache line replacement write back for each of those two cycles—before any of them are retired—, then a unique cycle tag entry is required for each of these cycles—four in all. If a snoop hit occurs to any of them, a retry response is generated.

What is claimed is:

1. A system for arranging and operating a multiprocessor computer server system having a "split-transaction bus" architecture, said multiprocessor computer server system including a plurality of bus module means operating with a bus cycle split into an address phase and a data phase, and arranged for access by at least one resource means, the resource means including requesting processor means, to facilitate "RETRY", said system also including:

Cache Tag means and Address Compare means, wherein said system is arranged so that a first of said plurality of bus module means stores address for said Resource means in a Cycle Tag means;

means for comparing a further address corresponding to at least one subsequent address bus cycle to the address stored in the Cache Tag means; and means for sending a "RETRY" direction to any other bus module means requesting access, as indicated when the address stored in the Cache Tag matches the further address, wherein said storing is effected when said Resource means completes the address phase, and wherein said Cache Tag means is arranged to support "cacheable lock" means arranged to perform load READ, WRITE sequences, including modifications thereof.

2. A system for arranging and operating a multiprocessor computer server system having "split-transaction bus" architecture, said system including a plurality of bus module means operating with an address phase and a cycle phase, and apt for accessed by prescribed resource means, to facilitate "RETRY", said system further including:

Cache Cycle Tag means and Address Compare means;

said system being arranged so that one of said plurality of bus module means stores the source-address, from said Resource means in said Cycle Tag means; and means for comparing subsequent address bus cycles to the contents of said Cache Cycle Tag means so that upon a "match", a suitable "RETRY" direction is sent to any other bus module means requesting access, wherein said storing being effected when said resource means completes the address phase.

3. The system of claim 2, wherein said Resource means includes a requesting processor means.

4. The system of claim 2, wherein the related system bus cycle is split into an address phase and a data phase.

5. The system of claim 4, wherein said Resource means includes a requesting processor means.

6. The system of claim 2, wherein said Cache Tag means is arranged to support "cacheable lock" means arranged to perform load READ, WRITE sequences, including modifications thereof.

7. For a multiprocessor computer system having split-transaction bus architecture, a method for servicing a "WRITE-MISS" by performing a Write-Allocation of a desired cache line from system memory, said system including Cache Controller means, address bus means, data bus means, system memory means, and cache tag means, wherein:

cache controller means said is arranged to gain control of said address bus means; and to generate an address cycle, wherein other cache controller means are arranged to snoop address for cache coherency or cycle hits; and if all miss, said other cache controller means are arranged to load cycle tag for write allocation cache line address;

then cause said cache controller means to begin monitoring said data bus means for cache line transfer;

then cause system memory means to gain control of said data bus means and to generate a data cycle; and then cause said cache controller means to receive data transfer, to update cache tag entries, to dear cycle tag entry, and to retire said bus cycle.

8. The system of claim 7, wherein said Cache Tag means is arranged to support "cacheable lock" means arranged to perform load READ, WRITE sequences, including modifications thereof.

9. A method for using a computer system having "split-transaction bus" architecture, including a plurality of bus module means operating with an address phase and a cycle phase, and said computer system apt for accessed by prescribed resource means, to facilitate "RETRY", said method also involving:

providing Cache Tag means and Address Compare means;

arranging said system so that a first one of said bus module means stores the source-address, from said Resource means in said Cycle Tag means;

then compares subsequent address bus cycles to the contents of said Cache Tag means; and then, upon a "match", sends a suitable "RETRY" direction to any other bus module means requesting access wherein said storing is effected when said resource means completes the address phase.

10. The method of claim 9, wherein said Resource means includes a requesting processor means.

11. The method of claim 9, wherein said Cache Tag means is arranged to support "cacheable lock" means arranged to perform load READ, WRITE sequences, including modifications thereof.

12. A method of using a multiprocessor computer system having split-transaction bus architecture for servicing a "WRITE-MISS" by performing a Write-Allocation of a desired cache line from system memory, said method including providing a plurality of Cache Controller means, plus address bus means, plus system memory means, and cache tag means, said method further including:

arranging control means in said cache controller means to gain control of said address bus means, and to generate an address cycle, while other cache controllers snoop the address for cache coherency or cycle hits and all miss;

and arranging said controller means to thereupon load cycle tag for write allocation cache line address, so said cache controller can begin monitoring the data bus means for cache line transfer; and providing system memory means arranged to gain control of data bus means, to generate cycle, wherein said cache controller means is arranged is arranged to receive data transfer; and to update cache tag entries, while clearing cycle tag entry, and retiring bus cycle.

13. The method of claim 12, including arranging said Cache Tag means to support "cacheable lock" means arranged to perform load READ, WRITE sequences, including modifications thereof.

14. A method of arranging and operating a multiprocessor computer server system having "split-transaction bus" architecture, including bus modules operating with an address phase and a cycle phase, and arranged for accessed by a prescribed resource stage, to facilitate "RETRY", this method including:

providing Cache Tag means and Address Compare means;

arranging the system so that a first bus module stores the address for the Resource stage in the Cache Tag means; and comparing subsequent address but cycles to the contents of the Cache Tag means, so that, given a "match", a "RETRY" direction is responsively sent to any other bus module that requests access.

* * * * *